March 24, 1964        E. V. HARLOW        3,126,334
PROCESS AND APPARATUS FOR MELTING HYDRATE CRYSTALS
Filed Dec. 18, 1961
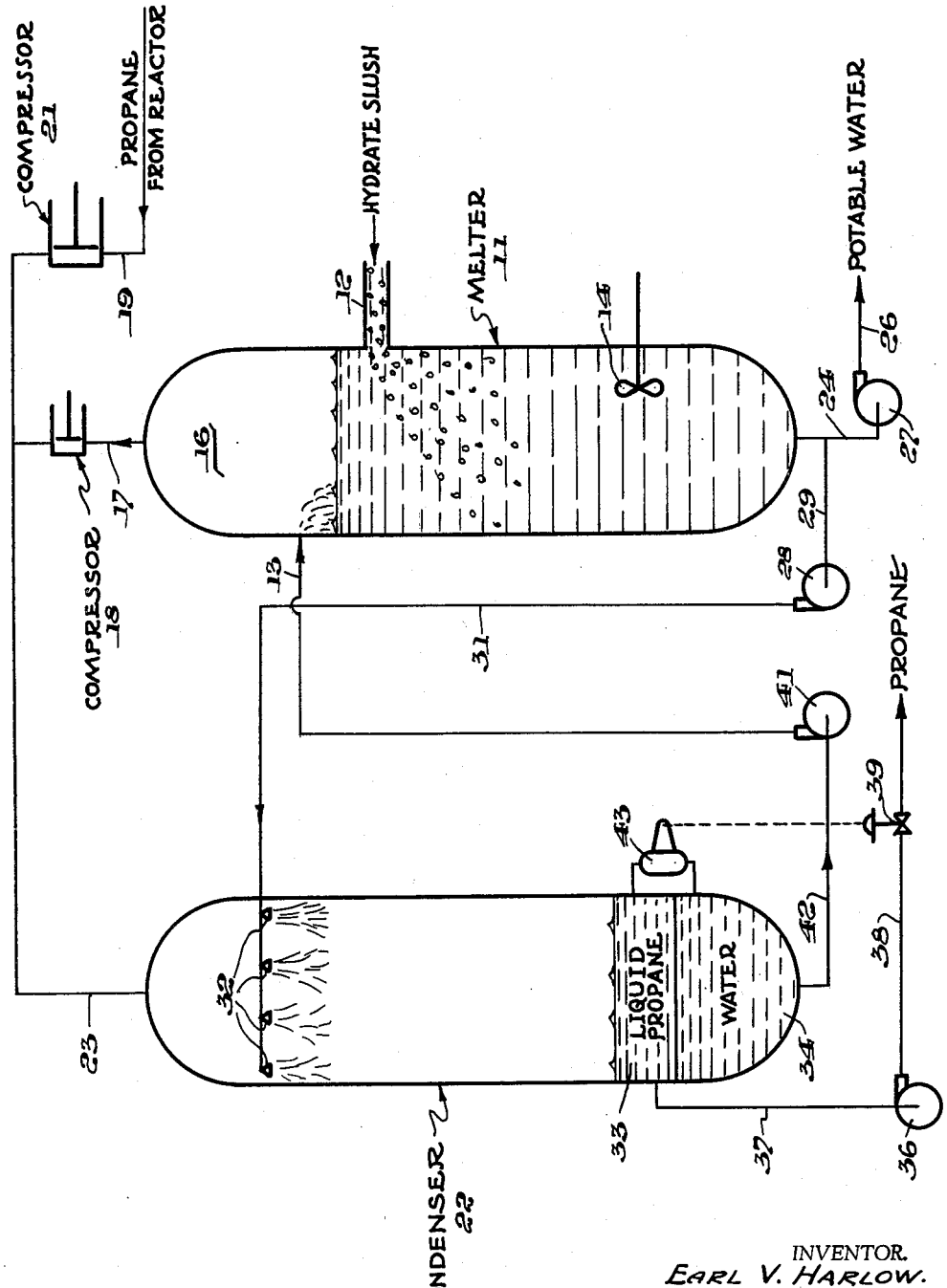
INVENTOR.
EARL V. HARLOW.
BY Leo I. MaLossi
his
ATTORNEY 3,126,334
PROCESS AND APPARATUS FOR MELTING
HYDRATE CRYSTALS
Earl V. Harlow, Pittsburgh, Pa., assignor to Koppers
Company, Inc., a corporation of Delaware
Filed Dec. 18, 1961, Ser. No. 159,899
3 Claims. (Cl. 210—60)

This invention relates to the separation of water from aqueous systems by the formation of hydrates with the water and, more particularly, to an improved method and apparatus for melting hydrate crystals so formed.

This invention arose during performance pursuant to a contract with the United States Government, Office of Saline Water.

The broad concept of producing potable water from saline solutions, such as sea water, by contacting the saline solution in a hydrate-forming zone with a hydrate-forming substance under hydrate-forming conditions of temperature and pressure to form a hydrate separable from a saline solution is disclosed in United States Patent 2,904,511 by Wilm E. Donath.

The importance of developing a cheap, but efficient, method for converting sea water and brackish water to potable water is becoming more sharply defined and its urgency more universally recognized as a result of about 90 studies made by various agencies of the United States Government. At present, our fresh water supply is adequate with a ratio of 5 gallons of available fresh water supply for each 3 gallons of fresh water demand. It is estimated as a result of these studies, however, that in about fifteen years this ratio will have changed to the point where there will be only 3 gallons of available fresh water supply for each 5 gallons of fresh water demand. In order to offset this future ratio of supply to demand, attention is being directed to an earnest search for commercial methods for providing our future needs for potable water from the sea.

Although the method and apparatus disclosed herein will be described in connection with the use of propane as the hydrate-forming substance, it is to be recognized that the same advantages available in connection with the melting of propane hydrate crystals by the use of this method and apparatus will inure particularly to the melting of hydrate crystals formed with those other hydrate-forming substances having but slight solubility in water and being gaseous at room temperature and pressure. As is well-known, hydrates may be formed with those paraffin hydrocarbons (in addition to propane) having from 1 to 4 carbon atoms, carbon dioxide, ethylene, acetylene, methyl chloride, ethyl fluoride, chlorine, argon, etc. in gaseous or liquefied form.

Although primary emphasis in the development of this process and apparatus has been placed upon the conversion of saline water to potable water, it should be equally well recognized that the method and apparatus disclosed herein in connection with the melting of hydrate crystals are applicable in dehydration procedures in general and, as such, are applicable in the removal of water from various beverages such as fruit juices, milk and beer.

In order to promote more efficient conversion of sea water to potable water, great care must be taken to conserve the energy input into the system. One way in which this is accomplished is by employing the hydrate-forming substance both as a hydrate-former and as a refrigerant.

In such an application during the hydrate-forming step, the hydrate-forming substance is introduced into the reactor in liquid form, part of the hydrate-forming substance evaporates and supplies the necessary cooling to maintain the reactor contents at hydrate-forming temperature. This gaseous hydrate-forming substance has, until the present time, been employed in the hydrate crystal melting operation giving up heat to the crystals and resulting in the decomposition thereof with simultaneous liquefication of the hydrate-forming substance. The liquefied hydrate-forming substance is then recycled to the reactor.

This direct contact between solid hydrate and the vapor of the hydrate-forming substance is, however, an inefficient mechanism due to the fact that as the solid hydrate melts the hydrate-forming substance in the liquid state becomes spread over and dispersed about the solid hydrate thereby reducing contact between the heat-containing vapor and the solid hydrate to which this heat must be dispensed. It is primarily to supplant this self-defeating heat exchange mechanism that the present invention has evolved.

In summary, the present invention provides a process and apparatus for more efficiently executing the exchange of heat energy required to decompose those hydrate crystals, the decomposition products of which are potable water and a gaseous hydrate-forming material having but slight solubility in water, by transferring heat from this gaseous hydrate-forming material product to a portion of the potable water product in a separate condenser vessel whereby the hydrate-forming material is liquefied and the portion of potable water is increased in temperature. Thereafter, the warm water is transferred to the melter and additional solid hydrate is dispersed therein providing further melting of hydrate and cooling of the water input.

Since only part of the potable water produced from the melting step is required for the heat exchange process of the present invention, the balance of the potable water from the melter and the liquefied hydrate-forming substance from the condenser are removed as product.

It is, therefore, an object of the present invention to provide apparatus and a continuous process by which part of the potable water and hydrate-forming material formed during the decomposition of solid hydrates are used to effect heat exchange operations resulting in highly efficient heat transfer to the hydrate crystals to effect melting thereof.

The exact nature of this invention as well as other objects and advantages thereof will be readily apparent from consideration of the following specification relating to the annexed drawing wherein the apparatus required to effect the process of the present invention is schematically represented.

In the equipment schematically illustrated in the drawing, solid propane hydrate, probably in the form of a hydrate slush, enters melter 11 through conduit 12 after having been cleansed of brine in preceding filtering and washing operations.

As the brine-free solid hydrate enters melter 11, it becomes dispersed in the relatively warm water entering melter 11 through pipe 13. Dispersal of the propane hydrate crystals (temperature of about 5.7° C.) in the water and requisite exchange of heat energy between the water (temperature of about 8.7° C.) and the propane hydrate crystals may be further promoted by the use of agitation means such as stirrer 14.

The heat transfer between the input water and the solid hydrate results in the melting of the hydrate into its components, propane and potable water and at the same time cools the water admitted through pipe 13 to about 5.7° C. The pressure in melter 11 is maintained at about 80.5 p.s.i.a. in order that the propane will collect as a gas in the upper portion 16 of melter 11.

Gaseous propane and potable water are simultaneously removed from melter 11. In the case of the propane, this gas is removed through pipe 17 and submitted to compression in compressor 18. The compressed propane gas is then added to other propane gas from the reactor (not shown) wherein the propane hydrate was formed, this propane gas having been conducted through pipe 19 and compressed in compressor 21. Both streams of propane gas are then admitted to condenser 22 through pipe 23 at 88.0 p.s.i.a. Since propane at 88.0 p.s.i.a. will liquefy at a temperature of 8.7° C. or lower, the temperature of the combined streams of propane gas admitted to condenser 22 will be at least 8.7° C. and depending upon the amount of heat energy introduced into the propane gas by compressors 18, 21 the temperature of the propane gas stream may be even higher.

Potable water is drained from melter 11 through pipe 24. Part of this potable water is removed from the system as product through pipe 26 either by gravity or, if necessary, by means of pump 27. The greater portion of the potable water drained from melter 11, however, is forced by pump 28 through pipes 29 and 31 emerging within condenser 22 at a temperature of about 5.7° C. through spray heads 32. The water emerging from spray heads 32 will be in the form of small droplets to provide thorough dispersion thereof in the pressurized gaseous propane which is admitted to condenser 22 through pipe 23.

Intimate contact between the droplets of water and the compressed propane vapor results in condensation of the propane and warming up of the water. In the case at hand the temperature of the potable water from melter 11 is raised from its input temperature of about 5.7° C. to a temperature of about 8.7° C. This relatively warm water and the liquid propane settle to the bottom of condenser 22 with the liquid propane floating in a layer 33 upon the collected water 34. If the incoming propane gas is at a temperature of greater than 8.7° C. as the result of higher heat input by the compressors 18, 21 the propane gas simply first gives up sensible heat until the temperature thereof has been reduced to 8.7° C. and then the propane begins to condense giving up its latent heat, which is considerably more important in the practice of this invention. Condensation continues as long as there is a driving force, which in this case exists as long as water is present in condenser 22 at a temperature of less than 8.7° C.

The propane layer 33 is ready for removal and return to the hydrate-forming operation and is, therefore, removed by pump 36 via pipes 37 and 38 and valve 39. The warmed water, meanwhile, is removed from condenser 22 by pump 41 via pipes 42 and 13 and returned to melter 11.

The removal of liquid propane from the layer 33 is coordinated with the removal rate of the warm potable water through pipe 42 by the use of a level-detecting device 43. As long as the level of water layer 34 is below the mouth of pipe 37, valve 39 remains in the open position to permit the removal of liquid propane from layer 33. Should the level of water layer 34 rise in condenser 22 close to the mouth of pipe 37 or should the upper level of layer 33 of liquid propane diminish to the level of the mouth of pipe 37, these conditions are automatically detected by level-detecting device 43 which then actuates a solenoid or similar mechanism (not shown) closing valve 39 and preventing further removal of liquid propane.

Since the details of level-detecting device 43 form no part of the present invention and such devices are commercially available, further details on this device are believed to be unnecessary. Control over the removal of liquid propane may, of course, also be satisfactorily conducted by manually controlling the starting mechanism for pump 36 or by manually opening and closing switch for valve 39.

As has been described above and shown in the drawing, the present process is ideally suited for conduct as a continuous process thereby being advantageously adaptable to application in the commercial conversion of sea water to potable water.

All materials employed in the conduct of this heat exchange process are already employed in the basic conversion process of sea water to potable water obviating the necessity of employing outside sources of heat and requiring only a small energy input in the form of the energy employed in compressing the propane vapor removed from melter 11. As a result, great efficiencies are realized in the melting operation by providing optimum contact between the heat source and the solid hydrate at the expense of relatively small energy input.

Various modifications are contemplated and may obviously be resorted to by those skilled in the art without departing from the spirit and scope of the invention, as hereinafter defined by the appended claims, as only a preferred embodiment thereof has been disclosed.

What is claimed:

1. A process for melting the solid hydrate of a hydrate-forming material gaseous at room temperature and atmospheric pressure and very slightly soluble in water comprising dispersing the solid hydrate in potable water in a first vessel at a temperature and pressure promoting decomposition of the hydrate into potable water and gaseous hydrate-forming material, removing potable water from said first vessel, conducting part of the removed potable water into a second vessel, dispersing the water so conducted in fine droplets, removing gaseous hydrate-forming material from said first vessel, increasing the pressure of said gaseous hydrate-forming material to form compressed gas, introducing said compressed gas into said second vessel, said compressed gas and fine droplets being in intimate contact resulting in condensation of the hydrate-forming material and in an increase in the temperature of the fine droplets and recirculating the warmed potable water to said first vessel for effecting additional hydrate decomposition.

2. The process for melting solid hydrate substantially as set forth in claim 1 wherein the hydrate-forming material is propane.

3. Apparatus for melting the solid hydrate of a hydrate-forming material gaseous at room temperature and atmospheric pressure and very slightly soluble in water comprising a first pressure vessel containing solid hydrate dispersed in potable water, a second pressure vessel, means connected between said first pressure vessel and said second pressure vessel for introducing warmed potable water to said first pressure vessel, means connected to said first pressure vessel for introducing solid hydrate into said first pressure vessel, means connected between said first and second pressure vessels for removing potable water from said first pressure vessel to said second pressure vessel, means located in said second pressure vessel for dispersing the water so conducted in fine droplets within said second pressure vessel, means connected to said first pressure vessel for removing gaseous hydrate-forming material from said first pressure vessel, means connected to said removing means for pressurizing said gaseous hydrate-forming material, means connecting said pressurizing means and said second pressure vessel for introducing the hydrate-forming material as a compressed gas within said second pressure vessel to contact the fine droplets of water and means connected to said second pressure vessel for removing condensed hydrate-forming material from said second pressure vessel.

References Cited in the file of this patent

UNITED STATES PATENTS

| | | |
|---|---|---|
| 2,356,407 | Hutchinson | Aug. 22, 1944 |
| 2,904,511 | Donath | Sept. 15, 1959 |
| 2,974,102 | Williams | Mar. 7, 1961 |